(12) United States Patent
Lipponen et al.

(10) Patent No.: US 11,952,094 B2
(45) Date of Patent: Apr. 9, 2024

(54) MARINE POWER SYSTEM

(71) Applicant: ABB Schweiz AG, Baden (CH)

(72) Inventors: Harri Lipponen, Helsinki (FI); Arber Haxhiu, Helsinki (FI); Sami Kanerva, Helsinki (FI); Mikko Kajava, Helsinki (FI)

(73) Assignee: ABB Schweiz AG, Baden (CH)

( * ) Notice: Subject to any disclaimer, the term of this patent is extended or adjusted under 35 U.S.C. 154(b) by 452 days.

(21) Appl. No.: 17/306,446

(22) Filed: May 3, 2021

(65) Prior Publication Data
US 2021/0347459 A1    Nov. 11, 2021

(30) Foreign Application Priority Data

May 6, 2020 (EP) .................................... 20173227

(51) Int. Cl.
*B63H 21/17* (2006.01)
*B60L 50/70* (2019.01)
*H02M 7/44* (2006.01)
*H02P 27/06* (2006.01)

(52) U.S. Cl.
CPC .............. *B63H 21/17* (2013.01); *B60L 50/70* (2019.02); *H02M 7/44* (2013.01); *H02P 27/06* (2013.01); *B60L 2200/32* (2013.01)

(58) Field of Classification Search
CPC ......... B63H 21/00; B63H 21/17; B60L 50/70; B60L 2200/32; H02M 7/44; H02P 27/06

USPC ............................................................ 440/6
See application file for complete search history.

(56) References Cited

U.S. PATENT DOCUMENTS

| | | | | |
|---|---|---|---|---|
| 7,544,108 | B2* | 6/2009 | Rzadki | B63H 21/17 |
| | | | | 440/6 |
| 10,770,895 | B2* | 9/2020 | Clarke | H02J 3/00 |
| 2007/0077830 | A1 | 4/2007 | Rzadki et al. | |
| 2014/0077607 | A1 | 3/2014 | Clarke et al. | |

OTHER PUBLICATIONS

European Search Report; Application No. EP 20 17 3227; dated Sep. 1, 2020; 1 Page.

* cited by examiner

*Primary Examiner* — Lars A Olson
(74) *Attorney, Agent, or Firm* — Whitmyer IP Group LLC

(57) ABSTRACT

A marine power system including multiple of fuel cells, multiple of D C/AC converters and at least one propulsion motor. In the marine power system, each fuel cell of the multiple of fuel cells is connectable to an input of a DC/AC converter of the multiple of DC/AC converters and at least one group of multiple of DC/AC converters is connectable to the at least one propulsion motor to provide variable frequency and amplitude voltage to the at least one propulsion motor. Further, at least one of the multiple of DC/AC converters is connectable to a fixed frequency AC bus to provide voltage with a fixed frequency and amplitude to the fixed frequency AC bus.

15 Claims, 1 Drawing Sheet

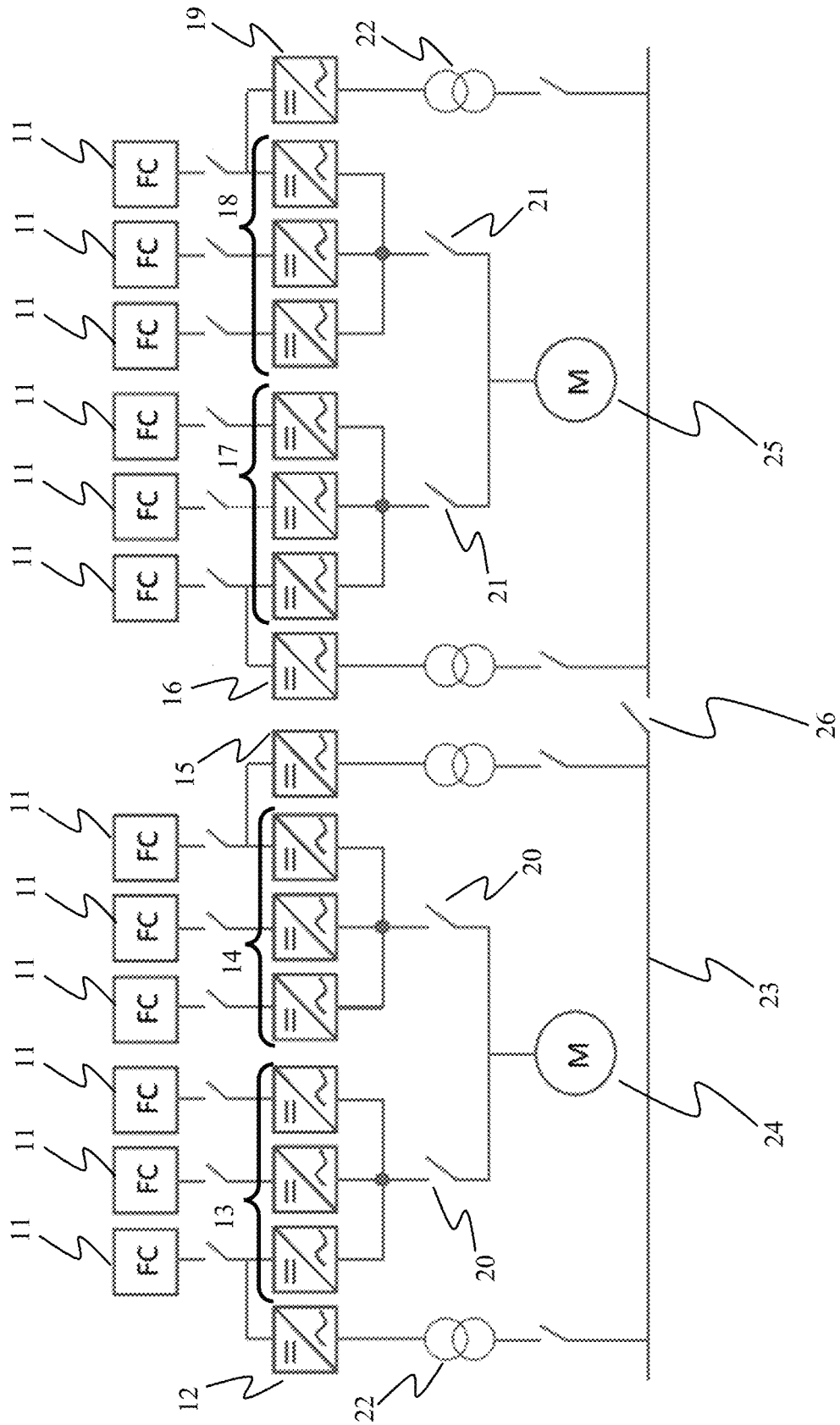

MARINE POWER SYSTEM

TECHNICAL FIELD

The invention relates to a power system, and particularly to a marine power system.

BACKGROUND

Marine power systems are independent power systems in which power is generated and delivered to all consumers or loads which are on board of the vessel. Electrical power is used in vessels in various purposes. In passenger vessels, for example, all the electrical power consumed by the passengers has to be generated on board. In addition to heating, ventilation and air conditioning (HVAC), the generated electrical power must also cover the consumption of all the supporting functions, for example restaurants and entertainment purposes. The passengers may also use their own electrical appliances and the electrical energy need to be supplied by AC power with certain amplitude and frequency.

To keep the vessel in operation, electrical power is consumed also in various control operations. The vessel may also be equipped with electrical propulsion system in which the propulsion is driven with electrical energy. Electrical energy may be supplied to the propulsion motors using frequency converters which are able to control the rotational speed of the propulsion system.

Electrical power can be generated in a vessel using prime movers which rotate generators. Typical example of a prime mover is a combustion machine. A rotating generator produces electrical energy with a frequency and a voltage amplitude. The frequency depends on the rotational speed of the prime mover. The electrical energy produced with rotating generator is not usable as such. The amplitude of the voltage needs to be transformed to another level so that it can be consumed on board. If the amplitude and the frequency of the generated voltage are constant and at a set level, a transformer may be used in converting the voltage to a suitable level to be consumed. Once the vessel has an electrical propulsion system, the generated electricity needs to be converted using converter devices in which desired output voltage is produced using electrical switching devices.

In a vessel with a rotating generator and an electrical propulsion system the generated voltage is typically first transformed to a suitable level. Then the AC voltage is converted to DC voltage with a certain DC voltage level using a switching converter. The DC voltage is again converted to variable frequency AC voltage for the propulsion motors. The electrical energy used otherwise in a vessel is produced in a similar manner using transformers and switching converters.

When fuel cells are used in a vessel for producing power, a typical configuration may by such that each fuel cell is equipped with own DC/DC converter. The output of the DC/DC converter is connected to a DC bus having a fixed DC voltage. This DC voltage may then be converted to the various consumers using DC/AC converters.

Each power conversion is generating losses and is also requiring own switching power conversion components increasing also the complexity of the system.

SUMMARY

An object of the present invention is to provide a system so as to overcome the above problems. The object of the invention is achieved by a system which is characterized by what is stated in the independent claim. The preferred embodiments of the invention are disclosed in the dependent claims.

In the invention fuel cells are employed as a primary source of electrical energy in a marine power system. The idea of the invention is to connect the outputs of fuel cells directly to inputs of DC/AC converters and thereby to have minimal amount of power conversions in the system and still maintaining the redundancy levels needed for sea going vessels.

An advantage of the system is that the produced losses are kept as minimal as possible while still producing the electrical energy needed to operate a vessel with an electrical propulsion system. As the amount of power conversion devices is minimal, the cost of hardware is low. The small amount of hardware also decreases the physical size and weight of the complete system which is an important factor in a vessel. The small number of conversion devices also increases the simplicity and the robustness of the system. Another advantage of the system is the minimal environmental impact obtained with the use of fuel cells as the primary source of energy and with minimal amount of losses from the power conversions.

BRIEF DESCRIPTION OF THE DRAWINGS

In the following the invention will be described in greater detail by means of preferred embodiments with reference to the attached drawings, in which FIG. 1 shows an embodiment of a marine power system.

DETAILED DESCRIPTION

FIG. 1 is a general overview of a marine power system. In the system of FIG. 1, the electrical energy is produced using multiple of fuel cells 11. With a fuel cell it is generally referred to a fuel cell system in which multiple of fuel cells may be connected in series or in parallel to produce suitable power and voltage level. Further, the fuel cells need auxiliary systems to be in operation. The internal structure or the auxiliary systems are not presented in the drawings.

The marine power system of the embodiment of FIG. 1 comprises multiple of fuel cells 11, multiple of DC/AC converters 12, 13, 14, 15, 16, 17, 18, 19 and at least one propulsion motor 24, 25. As shown, each fuel cell of the multiple of fuel cells is connectable to an input of a DC/AC converter of the multiple of DC/AC converters. As known, fuel cells produce DC voltage. This DC voltage is inputted to the DC/AC converters which operate to convert the inputted DC voltage to an output voltage. Although not shown in FIG. 1, the outputted AC voltage is typically a three-phase voltage. Further, the internal structure of DC/AC converter is not shown. DC/AC converter, which are also referred to as an inverter, may have a bridge configuration and may provide alternating voltage by using pulse width modulation.

In the embodiment of FIG. 1, at least one group of multiple of DC/AC converters is connectable to the at least one propulsion motor to provide variable frequency voltage to the at least one propulsion motor. FIG. 1 shows groups 13, 14, 17, 18 of DC/AC converters. The inputs of these converters are connected to outputs of different fuel cells. Groups 13 and 14 are electrically connectable to propulsion motor 24 while groups 17 and 18 are electrically connectable to propulsion motor 25. As seen in the FIG. 1, the outputs of different groups 13, 14, 17, 18 are connected together. That is, the outputs of the DC/AC converters in group 13 are connected together and thus their outputs are synchronized if more than one of the converters are producing voltage. The outputs of groups 14, 17, 18 are synchronized correspondingly. The grouping of the DC/AC converters provides more operational flexibility and system redundancy.

FIG. 1 further shows that two outputs of two groups can be connected to feed a common load. The DC/AC converters in groups 13 and 14 are connectable to a propulsion motor 24, and the converters in groups 17 and 18 are connectable to propulsion motor 25.

In the embodiment of FIG. 1 at least one of the multiple of DC/AC converters is connectable to a fixed frequency AC bus to provide voltage with a fixed frequency and voltage to the fixed AC bus. FIG. 1 shows DC/AC converters 12, 15, 16, 19 having their outputs connected through a transformer 22 to the AC bus 23. The AC bus is typically a three phase system having a conductor for each phase. The fixed frequency AC voltage is used in a vessel typically for all other uses than for the propulsion system, such as for the accommodation, restaurants, and generally maintaining the operations in a vessel. The DC/AC converters 12, 15, 16, 19 produce AC voltage with a fixed frequency and with a fixed amplitude. The transformers 22 are used to galvanic separation purposes, to voltage adaptation i.e. to increase or decrease the amplitude and to filter the produced voltage waveform. The transformers also reduce the propulsion system common mode voltage effects and EMC effects on the fixed clean AC grid side.

According to an embodiment, the transformer comprises multiple of primary windings and a secondary winding which is connectable to the fixed frequency AC bus. Each primary winding of the embodiment is connectable to a separate DC/AC converter such that power can be fed to the transformer from multiple of DC/AC converters.

In an embodiment of the invention, the stator of the propulsion motor has a dual-three phase structure. When having a dual-three phase structure, the stator has two sets of three phase windings. The separate three phase windings are supplied with separate three phase voltages. If, for example, the stator of the motor of FIG. 1 is equipped with a dual-three phase structure, the stator is supplied with separate voltages from groups 13, 14 and 17, 18. The dual-three phase stator structure may enable to power the motor only with one set of windings or with both sets of windings.

In another embodiment, the outputs of the converter groups which may feed power to a same motor are connectable to each other. In such a case the outputs of the parallel converter groups are synchronized to feed power to a single winding system of a three phase motor. To be more precise, outputs of the DC/AC converters in groups 13 and 14 are synchronized such that the output voltages of each active converter have the same output voltage.

DC/AC converters may be operated to provide u/f-control to the propulsion motor using any suitable control principle, such as scalar or vector control. However, other motor control schemes exist and are applicable depending on the motor type. Propulsion motor system can also be of any type, including in-board or podded motors, geared or direct driven motors or azimuthing motors or ones equipped with a separate rudder.

The parallel operation of different DC/AC converters may require additional components, such as inductors, to be installed at the outputs of the converters such that the currents of the devices are balanced. Such additional components are not shown in the drawing.

FIG. 1 shows a redundant fixed AC grid system in which two similar structures can be operated either independently of each other or in synchronism. The AC bus is shown to divided in two with a connector. When the connector is open, the systems can be operated independently as separate systems. When the connector is closed, then the fixed AC voltages from both of the similar structures has to be synchronized if AC voltage with a fixed frequency is generated by both of the similar structures.

According to an embodiment of the invention, at least one of the fuel cells is connectable to two DC/AC converters of the multiple of DC/AC converters. The first of the two DC/AC converters is connectable to the at least one propulsion system and the second 12 of the of the two DC/AC converters is connectable to the fixed frequency AC bus. The fact that one fuel cell can be connected to two DC/AC converters increases further the flexibility obtained with the system. Input to a DC/AC converter does not necessarily mean that the converter in question is operating. When, for example, a fuel cell 11, which is connectable to DC/AC converter 12 is also connectable to one of the converters in group 13, the converter 12 may be operational while converter in group 13 is not operated. According to another embodiment, multiple of fuel cells may be connected to a DC/AC converter which feeds power to the fixed AC bus. In such an embodiment, switches and/or connectors is arranged such that two or more fuel cells are connectable to a DC/AC converter which powers the fixed frequency AC bus.

The system of the invention has a wide flexibility and can be operated in an efficient manner. The number of the fuel cells which are providing power can be selected case by case and based on the required power. For example, an upper level controller may provide a power reference, and based on the power reference, the required number of fuel cells are operated. The upper level controller may also keep track of the working condition of the fuel cells and select specific fuel cells in operation depending on the status of the fuel cells. The upper level controller may also take into account fuel cell life cycle and maintenance related aspects when selecting which fuel cells are operated.

An efficient manner of operating fuel cells is to use them with a certain output current. The level of output current affects to the output voltage of the fuel cells. The output of a fuel cell is at the highest with open circuit, i.e. when the current from the fuel cell is zero. Once loaded, the output voltage decreases as a function of the output current. The fuel cells and the DC/AC converters need to be dimensioned according to the required power and the open circuit voltage of the fuel cells.

The upper level controller may also optimize the efficiency of the fuel cells by increasing and decreasing the number of the operated fuel cells. With increasing power demand, the current from the fuel cells needs to be increased. Further, as the efficiency of a fuel cell decreases with increasing current, it may be advisable to connect more fuel cells to supply the current and thereby to increase the efficiency. In addition, the fuel cells have a minimum current limit in which the power feed from a fuel cell can be started. The upper level control system may take the above aspects into account when selecting the number of used fuel cells.

The minimum load level of the fuel cells may be taken into account by staring the fuel cells in sequential manner. The fixed frequency AC bus may also be used as loading for enabling the start of the fuel cells. The fixed AC bus has typically some power consumption, and the consumption can be influenced such that minimum load of the fuel cell can be achieved. Further, the system of the invention enables to increase the system level losses for example by rotating the energy through multiple of power units or by generating extra losses in some system component, in a propulsion motor or in the AC transformer.

The systems operational efficiency can be adjusted by the system operation modes, i.e. by changing the number of active fuel cells. However, in the invention, power components and power conversions are reduced and thereby efficiency is obtained through the structure of the system.

In an embodiment of the invention, at least one DC/AC converter is bi-directional enabling to transfer power in both directions. When a DC/AC converter which is powering the propulsion motor is bi-directional, the propulsion system can be feeding energy from the propulsion motor back to the system when the propulsion system is used as a brake. When braking, the propulsion motor is in a regenerative mode and acts as a generator producing alternating voltage. This voltage can be rectified with a bi-directional DC/AC converter. The generated power may be fed to the DC/AC converter 12, 19 which is connected to the same DC side of another DC/AC converter. The DC/AC converter may thus feed the generated power to the fixed frequency AC bus. Another alternative is to use brake choppers in the DC side of the DC/AC converters to dissipate the regenerated power obtained with braking action.

The power obtained from one propulsion motor may also be used in powering the other propulsion motor through the fixed frequency AC bus. Considering the example of FIG. 1, when a contactor 26 between parallel systems is closed, power can be fed from one propulsion motor 24 to the other motor 25. When separate windings are arranged in the stator, one part of the windings can be used in generating power while other part of the windings are used for rotating to the motor. The generated power can be fed through the fixed frequency AC bus to the DC/AC converter and further to another DC/AC converter to the other propulsion motor. The DC/AC converter connectable to the fixed frequency AC bus in the embodiment is also a bi-directional converter enabling to rectify the voltage from the fixed AC bus. As is understood, the efficiency of the system is not at the highest when operating in above-described manner. However, when both or multiple of propulsion motors can be used even in lower power, the controllability of the vessel in increased when compared to a case where only one of multiple propulsion motors is operated.

In addition to power from the fuel cells and from the propulsion motor, the DC/AC converters feeding power to the fixed frequency AC bus may also be utilized with energy from the shore when in harbour.

The fuel cells are operated independently of each other and the output voltage of the fuel cells is not regulated to a certain value. Each of the output voltages can have a different value and the value is mainly dependent on the load of the fuel cell in question. In an embodiment of the invention fuel cells are operated in groups. Such groups may have common auxiliary systems and the operation of these auxiliary systems may require that fuel cells of the group are operated in a same operation point. For example, in FIG. 1 the fuel cells may be grouped to groups of two or three fuel cells having common auxiliary systems.

In an embodiment of the invention at least part of the fuel cells and part of the DC/AC converters are arranged as pairs, in which pairs a fuel cell is directly connectable to a DC/AC converter. FIG. 1 shows an example, in which fuel cells are connectable directly to a DC/AC converter. When fuel cells are connected directly to a DC/AC converter, the operation points of the fuel cells can be controlled separately. The control of the operation point is achieved by controlling the fuel cell current.

Further, according to an embodiment, DC/AC converters of fuel cell and DC/AC converter pairs are connectable directly to a propulsion motor. When a fuel cell and DC/AC converter pair is connected to a propulsion motor, only one conversion of electricity is required from the fuel cell to the propulsion motor. As only one conversion is needed, the efficiency of the system is maximal. The energy efficiency is further increased by the fact that the operation point of each fuel cell can be controlled by the DC/AC converter. The DC/AC converter of the system operates thus both to set the operation point of the fuel cell and to provide controlled power to the propulsion motor.

According to an embodiment at least two pairs of fuel cells and DC/AC converters are connected together at the AC side of the DC/AC converter. In the embodiment, the pairs are connected in parallel at the AC side of the DC/AC converter and are feeding a common load. In the following, an example is considered in which the system of FIG. 1 is taken into use and the generated power is increased. A fuel cell is operated to produce power to the fixed AC bus for example trough converter 12 and transformer 22. A command is received from an upper level control system to increase the power so that the propulsion motor 24 can be taken into use. The contactor 26 in the AC bus between the similar systems is open and power is generated only with the system having the motor 24. The command for increasing power is received in a common controller of the fuel cells. The common controller may be the above referred upper level controller. The command is interpreted such that three of the six fuel cells are required to fulfil the power demand. Thus three fuel cells 11 are activated. As only three fuel cells are activated, some other fuel cells are inactive, which has a positive effect to the fuel cell lifetime.

The output voltage of the fuel cells is increased, and during the increase of the voltage contactors between the activated fuel cells and the DC/AC converters are closed and the converters are started. The started converters are, for example, in group 14 enabling to increase the propulsion power.

The power demand from the upper level controller is also transmitted to the controller of the DC/AC converters which interpret the demand as a rotational speed instruction, for example. The DC/AC converters operate in synchronism and produce a voltage fed to the propulsion motor through closed contactor 20 with a desired frequency such that the propulsion motor is rotated. Each increase or decrease of the power demand increases or decreases the produced power. The change in demand may also require that an additional fuel cell is started and operated independently of the other fuel cells.

The DC/AC converter which is also operated to feed power to the fixed AC bus can be used in producing power to the propulsion motor. If, for example, the power demand from the AC bus decreases, this power may be used in rotating the propulsion motor. The control system associated with the fuel cells is able to optimize the fuel cells. The operation point of the fuel cells is known in the control system, and when change is required in the power of the system, the operation of the fuel cells is optimized. In practice, this means that, for example, the operation point of the fuel cell which is not in the most optimal operation point or not in a desired life cycle point is changed when a change in power is requested.

Although not shown in the FIG. 1, the fixed frequency AC bus may be also fed by a generator or by an energy storage system having a battery or similar in electrical energy storage. Further, a fuel cell providing power to a propulsion system through a DC/AC converter may be replaced by an energy storage system. The replacement of a fuel cell may be a temporary replacement or a fixed installation. Thus the system may be operated such that an energy storage system is connected to a DC/AC converter.

The invention provides a power system in which a minimal number of power conversions are required. The fuel cell variable DC voltage is converted with single conversion to the propulsion motor, and other separate power conversions for fixed AC power. The minimal amount of power conversions leads to decreased power losses and to a high system level efficiency while providing great level of flexibility and redundancy.

Asynchronous type propulsion motor can be used by the default, but other machine types are not excluded.

It will be obvious to a person skilled in the art that, as the technology advances, the inventive concept can be implemented in various ways. The invention and its embodiments are not limited to the examples described above but may vary within the scope of the claims.

The invention claimed is:

1. A marine power system comprising:
multiple of fuel cells:
multiple of DC/AC converters; and
at least one propulsion motor,
wherein:
each fuel cell of the multiple of fuel cells is connectable to an input of a DC/AC converter of the multiple of DC/AC converters
at least one group of the multiple of DC/AC converters is connectable to the at least one propulsion motor to provide variable frequency and amplitude voltage to the at least one propulsion motor,
at least one of the multiple of DC/AC converters if connectable to a fixed frequency AC bus to provide voltage with a fixed frequency and amplitude to the fixed frequency AC bus,
the power system further comprises a transformer which is connectable between an output of the at least one of the multiple of DC/AC converters and the fixed frequency AC bus, and
the transformer comprises multiple of primary windings, each primary winding being connectable to a separate DC/AC converter, and a secondary winding connectable to the fixed frequency AC bus.

2. The marine power system of claim 1, wherein
at least part of the fuel cells and part of the DC/AC converters are arranged as pairs, in which pairs a fuel cell is directly connectable to a DC/AC converter.

3. The marine power system of claim 2, wherein DC/AC converters of fuel cell and DC/AC converter pairs are connectable directly to a propulsion motor.

4. The marine power system of claim 2, wherein at least two pairs of fuel cells and DC/AC converters are connected together at AC side of the DC/AC converter.

5. The marine power system of claim 1, wherein at least one of the fuel cells is connectable to two DC/AC converters of the multiple of DC/AC converters, wherein
the first of the two DC/AC converters is connectable to the at least one propulsion system and
the second of the of the two DC/AC converters is connectable to the fixed frequency AC bus.

6. The marine power system of claim 5, wherein multiple of fuel cells are connectable to the second of the two DC/AC converters which is connectable to the fixed frequency AC bus.

7. The marine power system of claim 1, wherein the at least one propulsion motor comprises a stator with at least two sets of stator windings.

8. The marine power system of claim 7, wherein the stator comprises a dual-three phase winding.

9. The marine power system of claim 1, wherein at least one of the DC/AC converters is a bi-directional converter.

10. The marine power system of claim 9, wherein at least one of the DC/AC converters connectable to the at least one propulsion motor is a bi-directional converter.

11. The marine power system of claim 10, wherein the propulsion motor is adapted to be operated in a regenerative mode and the at least one DC/AC converter is adapted to feed the power obtained from the propulsion mode to a DC/AC converter which is connectable to the fixed frequency AC bus.

12. The marine power system of claim 9, wherein at least one of the DC/AC converters connectable to the fixed frequency AC bus is a bi-directional converter.

13. The marine power system of claim 12, wherein the bi-directional converter connectable to the fixed frequency AC bus is adapted to feed the power obtained from the fixed frequency AC bus to at least one DC/AC converter which is connectable to a propulsion motor.

14. The marine power system of claim 3, wherein at least two pairs of fuel cells and DC/AC converters are connected together at AC side of the DC/AC converter.

15. The marine power system of claim 2, wherein the at least one propulsion motor comprises a stator with at least two sets of stator windings.

* * * * *